United States Patent [19]
Aoyama et al.

[11] 3,958,732
[45] May 25, 1976

[54] METHOD FOR BREAKING STEEL ROD INTO BILLETS

[75] Inventors: Shigetsune Aoyama, Okazaki; Masahiko Kato, Aichi; Motoo Matsubara, Kasugai; Osamu Furuta, Tokai, all of Japan

[73] Assignees: Kabushiki Kaisha Toyota Chuo Kenkyusho; Aichi Steel Works, Ltd., both of Japan

[22] Filed: Dec. 13, 1974

[21] Appl. No.: 532,732

[30] Foreign Application Priority Data
Dec. 15, 1973 Japan.................................. 48-4050

[52] U.S. Cl.................................... 225/2; 148/9.6; 225/93.5; 225/96; 225/96.5; 225/102
[51] Int. Cl.²........................................... B26F 3/00
[58] Field of Search.................. 225/2, 93.5, 94, 96, 225/96.5, 102; 219/68; 148/9.6; 266/8, 23 Q, 4 R, 4 F

[56] References Cited
UNITED STATES PATENTS

| | | | |
|---|---|---|---|
| 1,209,250 | 12/1916 | Bellanger............................ | 148/9.6 |
| 1,335,977 | 4/1920 | Macdonald....................... | 266/23 Q |
| 2,125,922 | 8/1938 | Hopfield.............................. | 225/2 |
| 2,298,528 | 10/1942 | De Causse.......................... | 225/2 X |
| 3,406,886 | 10/1968 | Wesel et al........................ | 225/2 |

*Primary Examiner*—J. M. Meister
*Assistant Examiner*—Fred A. Silverberg
*Attorney, Agent, or Firm*—Berman, Aisenberg & Platt

[57] ABSTRACT

A method for breaking a steel rod into billets for forging, rolling, etc., by cutting a circumferential notch in the surface of the steel rod, locally heating the surface areas of the rod adjacent the notch so that the temperature at the notch bottom is less than a transformation temperature of the steel of the rod, quenching the rod thereby to develop a crack extending from the notch bottom toward the center of the rod, and applying a mechanical load to break the rod along its notched portion.

19 Claims, 12 Drawing Figures

A—HEATED AREA

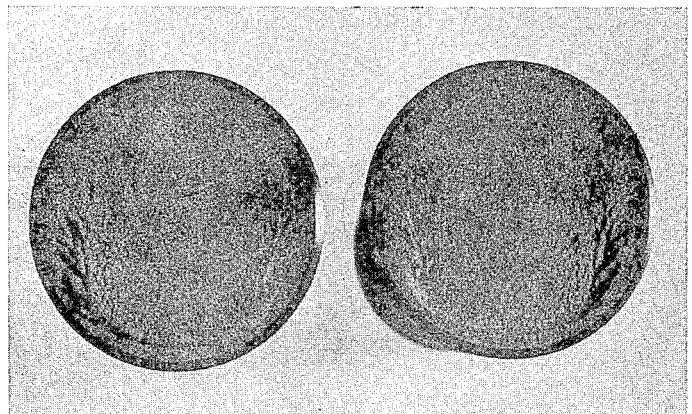
FIG.4ª.  FIG.4ᵇ.
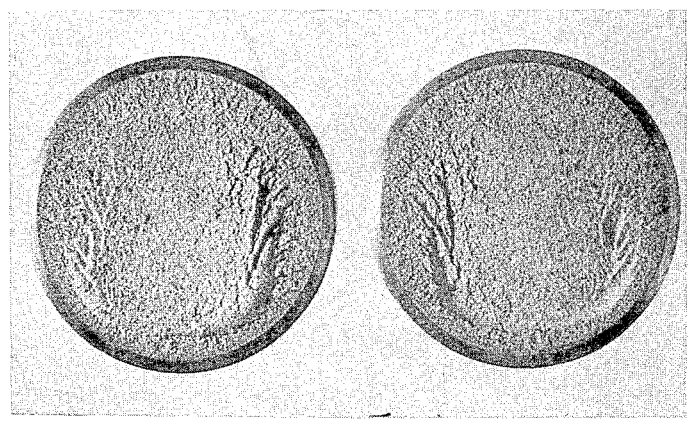
FIG.5ª.  FIG.5ᵇ.
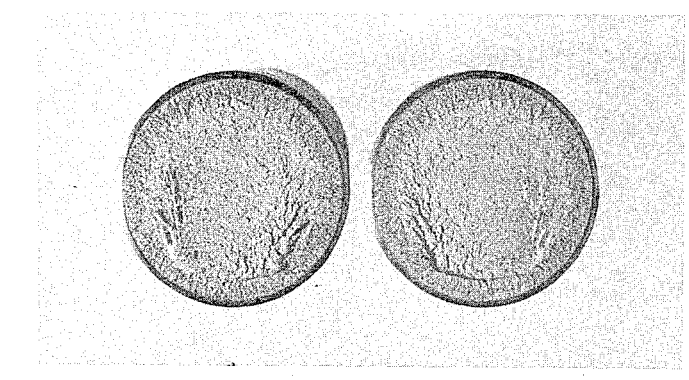
FIG.6ª.  FIG.6ᵇ.
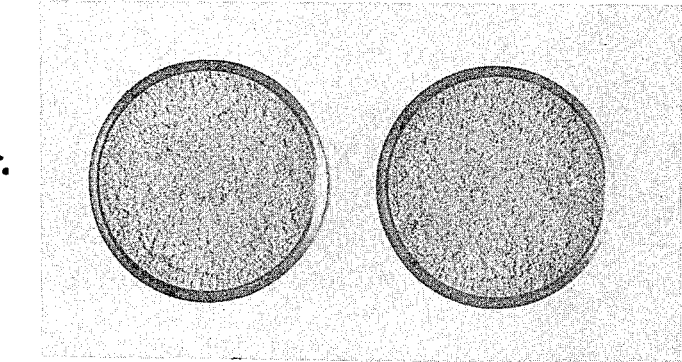
FIG.7ª.  FIG.7ᵇ.

METHOD FOR BREAKING STEEL ROD INTO BILLETS

BACKGROUND OF THE INVENTION

This invention relates to a method for breaking a steel rod, a steel bar, or a steel pipe into billets for forging, rolling, etc., and more particularly to a method which yields billets such as forging billets with flat broken surfaces when relatively low mechanical loads are applied without causing large amounts of vibration or noise.

Forging billets are formed by cutting a steel rod or a steel pipe to given dimensions suitable for and preparatory to the forging operation. Steel rods, steel bars or steel pipes may be used as the starting material form and all will be defined herein as included in the term "steel rod", as referred to hereinafter. Hitherto, it has been common practice to obtain forging billets by either a shearing or a sawing technique.

The shearing technique has been more widely used than the sawing technique. However, shearing has a number of disadvantages, such as failure to achieve flat cut surfaces, deformation of the edge portions of the billets, and formation of burrs, cracks, etc., when hard steel rods made of bearing steel, high carbon alloy steel or high carbon steel are used as the base material. For these reasons, difficulties have been experienced in obtaining forging billets having precise and accurate weights. Die forging a billet of excessive weight results in a product having a surplus portion as flash, and wastes material. Also, in such instance, an overload is applied to the forging machine, so that a forging machine having a larger capacity is required to be used. When a forging billet of insufficient weight is used, a non-full sized or defective product necessarily results. In addition, the lack of flatness of the cut or sheared surface of a forging billet, during die forging in the axial direction of the billet, causes falling or inclination of the billet during forging with adverse effects and results on the product. The shearing technique of forming billets requires a very great shearing force, so that a costly shearing machine must be used with accompanying large amounts of vibration and noise during the shearing.

The sawing technique of forming billets yields satisfactory cut surfaces without causing excessive vibration and noise, but it suffers from poor work efficiency. In addition, in forming forging billets from steels of high hardness in a rolled state the rods must be subjected to annealing, thus increasing the cost.

To overcome the above briefly described defects, studies have been made of mechanical breaking of steel rods having notches therein. However, the mere application of a mechanical load on a notched rod fails to yield broken surfaces in alignment with the bottom of the notch, thus resulting in large variations in the weights of forging billets as well as poor flatness of the broken surfaces. The present invention is applicable not only to forging billets but also to billets for rolling, extruding, drawing, peeling and machining.

SUMMARY OF THE INVENTION

According to the present invention, there is formed a circumferential notch in a steel rod, and then heating and cooling are applied to the surface areas of the steel rod in the areas adjacent the notch to produce a crack or cracks extending from the bottom of the notch toward the center of the steel rod, whereby the steel rod may then be readily broken under a small mechanical load, without causing vibration and noise, and yielding good flat broken surfaces. In this invention the circumferential notch is provided wholly or partially along the circumference of the rod. Further, the shape and size of the material and billets are not limited to those of the examples described hereinafter.

According to the present invention, there are provided two methods for causing the cracks which then permit breaking of the rod by a small mechanical load. The two methods differ from one another mainly in the number of heating and cooling cycles applied to the rod before the mechanical load is applied.

The primary object of the present invention is to provide a method for breaking a steel rod, bar or pipe to yield billets for forging, rolling, etc., having flat broken surfaces utilizing a low mechanical load and avoiding undue vibration and noise.

A further object of the present invention is to form billets for forging, rolling, etc., of a uniform shape and having precise dimensions.

Still another object of the invention is to provide an easy and economical process for making billets.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments, when read in connection with the accompanying drawings, wherein like reference characters indicate like parts throughout the several Figures, and in which:

FIGS. 4a and 4b are photographs of the broken surfaces of a steel rod prepared in Example 1 of the present invention;

FIGS. 5a and 5b are photographs of the broken surfaces of a steel rod prepared in Example 2 of the present invention;

FIGS. 6a and 6b are photographs of the broken surfaces of a steel rod prepared in Example 3 of the present invention; and FIGS. 7a and 7b are photographs of the broken surfaces of a steel rod prepared in Example 4 of the present invention.

DESCRIPTION OF THE PREFERRED EMBODIMENTS

Figure 1:
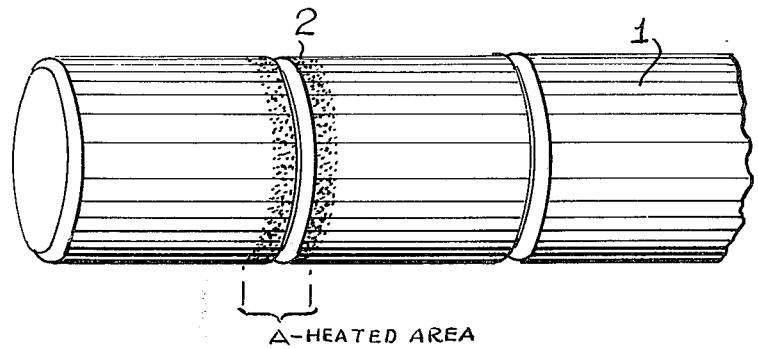
FIG. 1 is a perspective view of a steel rod having a circumferential notch formed in its surface.

According to the first method, as shown in FIG. 1, a circumferential notch 2 is formed by cutting or otherwise in the surface of a steel rod 1, and then rapid heating and quenching are applied to the surfaces of the rod in the areas immediately adjacent the notch 2 so as to produce a large temperature difference between the surface and interior portions of the rod in the neighborhood of the aforesaid notch. The heating is restricted as much as possible to the immediate locality surrounding the notch, as for example, the area marked A in FIG. 1. The heat applied to the rod is such that the surface of the rod at the bottom portion of the notch will not reach the transformation temperature, i.e. the temperature at which transformation of ferrite to austenite occurs in the steel. This, after quenching, creates a crack or cracks extending from the bottom of the notch toward the center of the rod. Then, a mechanical load is applied to break the rod along the notched portion thereof. The mechanical load may be applied during the step of quenching.

The notch 2 may be formed of any suitable method, such as machining, plastic working, etc. For producing cracks accurately leading to the bottom of the notch, it is preferable that the shape of the bottom be sharp (for example, like a V-shape). However, extreme sharpness is not essential. When heating, it is imperative to rapidly apply heat to the surface portion of the rod to create a large temperature difference between the surface and interior portions of the rod. In this respect, high frequency induction heating, flame heating, etc. are recommended for use. In addition, it is preferable that the heat applied to the surface of the rod be as high as possible, as long as the bottom of the notch is not heated to the transformation temperature of the steel of the rod. Rapid cooling or quenching following such rapid heating causes a tensile stress acting on the bottom surface portion of the notch, to produce a crack or cracks. It is not harmful to heat the surface of the rod above the bottom of the notch to a transformation temperature of the steel and then harden the rod. However, if the surface of the bottom portion of the notch is heated to a temperature above the transformation temperature of the steel, no cracks will be produced because the residual stress at such bottom portion of the notch will be of a compressive nature rather than a tensile nature. But if the surface temperature of the heated rod is too low, a large difference in thermal expansion between the surface and interior of a rod will not be created so a tensile stress sufficiently large for causing cracks will not appear. It is preferable during heating that the temperature applied to the surface of the rod be above 600° C, although this temperature depends on the types of steel, sizes of rod, sizes and shapes of a notch, types of heating, etc. As mentioned above, the temperature at the bottom portion of the notch should be less than a transformation temperature.

Figure 2:
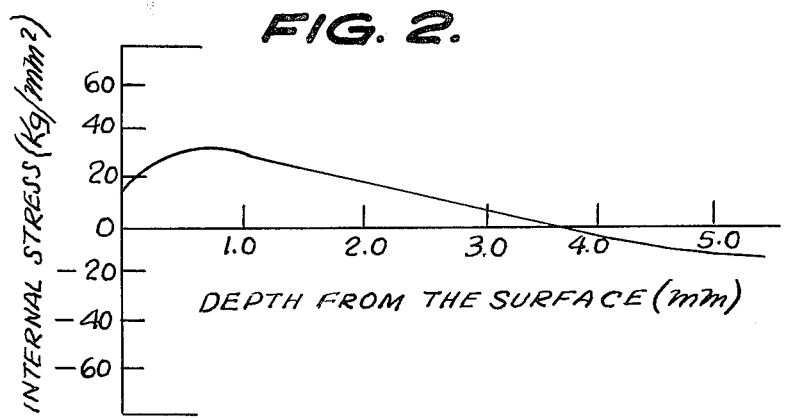
FIG. 2 is a graph showing the distribution of internal stress in a steel rod which has been subjected to heat treatment according to the first method of the present invention.

FIG. 2 shows the axial internal stress distribution in a steel rod made of SUJ2 (Japanese Industrial Standards, a high carbon chromium bearing steel) with a diameter of 55mm, when the rod was subjected to rapid heating and quenching. High frequency induction heating using a valve oscillator was applied under the following conditions; electric power 91 KW, surface electric power density 1.75 KW/cm$^2$ and heating duration of 3 seconds, followed by quenching in water. As can be seen from the drawing, the maximum residual tensile stress occurs at a depth range of 0.5mm to 1.5mm from the rod surface. For this reason, the bottom of the notch (depth of the notch) should be positioned in this range. In the above test, with the depth of a notch at 1.5mm, cracks of a length 4mm to 5mm were caused, these cracks extending from the bottom of the notch towards the center of the rod.

In a number of tests undertaken by the inventors it was determined that for achieving desired cracks consistently in the above heat treatment, the heating duration should be about 2 to 10 second. If the heating duration is less than about 2 seconds, uneven distribution of heat occurs. Conversely, if the heating duration is longer than about 10 seconds a large temperature difference between the surface and interior portions of a rod will not be maintained, and as a result little if any cracking will result.

In the above heat treatment, when high frequency induction heating using a valve oscillator is employed, the surface electric power density (input heat quantity per unit time and unit area) of about 1.2 KW/cm$^2$ to 2 KW/cm$^2$ is suitable. When flame heating is employed, the input heat quantity (per unit time and unit area) of 0.14 Cal/cm$^2$·sec. to 0.25 Cal/cm$^2$·sec. is suitable. As previously explained, the present invention is not limited as to duration of heating except that it must fall in the range of about 2 to 10 seconds.

After, or simultaneously with, the formation of one or more cracks in the rod, a low mechanical load is applied to the rod by means of static or impact bending, twisting or pulling, alone or in combination. At this point a break in the notched portion of the steel rod takes place without causing vibration and noise and yielding flat broken surfaces. According to the method of the present invention, the breaking load can be reduced to 1/7 of that required for a steel rod having a notch but not subjected to the above described heat treatment. The aforesaid rapid heating and quenching may be repeated to achieve further good results as explained below with respect to the second inventive method.

The second inventive method, as in the first method, includes forming a circumferential notch in the surface of a steel rod, but then departs from the first method in that rapid heating and quenching are repeatedly applied to the surface area of the rod adjacent the notch, followed by the application of a low mechanical load to break the rod. The application of the mechanical load may be simultaneous with the last quenching. The first method is an easy operation to perform, but suffers from the disadvantage that the desired cracks may not be consistently achieved, for example, if the diameter of the steel rod is relatively small. The second method consistently yields desired cracks of greater depth, so that the steel rod may be broken by applying a lower load.

In the second method, the first cycle of rapid heating is applied to the surface portion of the steel rod in the neighborhood of the notch using either high frequency induction heating or flame heating to produce a large temperature differential between the surface and interior portions of the rod, followed by quenching. However, a difference in the second method is that the surface of the steel rod near the notch is heated so as to be hardened and that the depth of hardening may reach to the bottom of the notch. To accomplish this, the surface temperature of the steel rod upon heating may vary depending on the type of steel, but preferably falls in the range from about 800° to 1100°C.

The second cycle of the heat treatment is carried out following the first cycle of the heat treatment. In the second cycle of heat treatment, the steel rod is rapidly heated to about 500°C provided that the surface temperature at the bottom portion of the notch falls short of a transformation temperature, that is, a temperature relatively lower than that in the first cycle, and is followed by quenching.

The heating duration in the first heat treatment should be about 2 to 10 seconds, while that of the second heat treatment should be about 1 to 8 seconds.

Figure 3A:
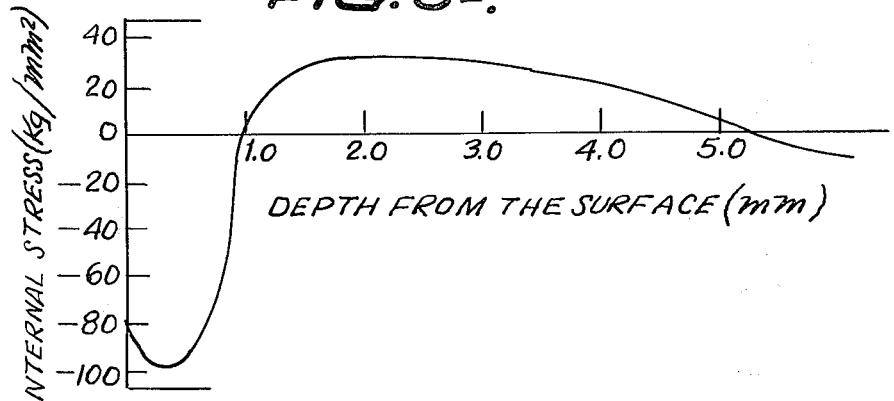
FIG. 3a is a graph showing the distribution of internal stress in a steel rod which has been subjected to the first heat treatment according to the second method of the present invention.
Figure 3B:
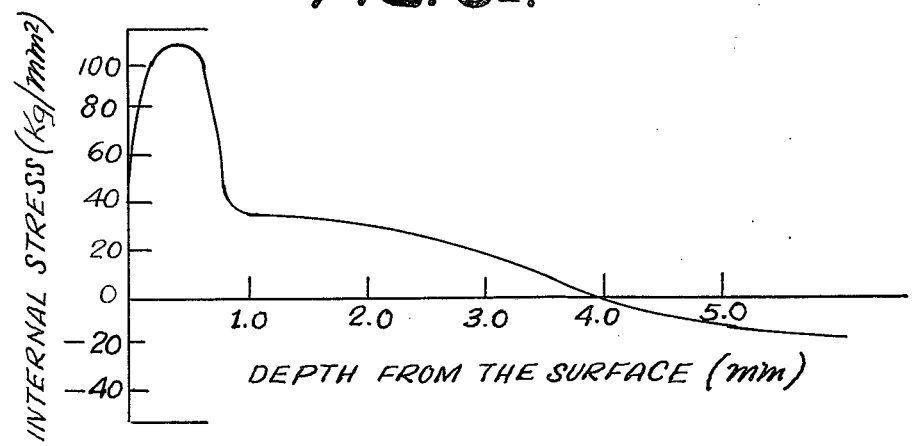
FIG. 3b is a graph showing the distribution of internal stress in a steel rod after it has been subjected to the second heat treatment according to the second method of the present invention.

FIG. 3a and FIG. 3b show the stress distribution caused in a steel rod according to tests given to a steel rod of SUJ2 (high carbon chromium bearing steel), and of a diameter of 38mm. FIG. 3a shows the stress distribution of a steel rod which has been subjected to a first high frequency induction heating using a valve oscillator with an electric power of 91 KW and a surface electric power density of 2.55 KW/cm$^2$ for 3 seconds and then quenched. In this figure, there is shown a compressive stress extending inwardly from the rod surface up to a depth of about 1mm. Between 1mm and about 5mm a tensile stress exists in the rod. At a depth greater than 5mm the stress changes to compression again. FIG. 3b shows the stress distribution in a steel rod which has been subjected to a second high frequency induction heating under the conditions of electric power; 91 KW, a surface electric power density of 2.55 KW/cm$^2$ for 2 seconds, followed by quenching. As can be seen from this figure, the surface of the rod for about 1mm. depth, where there was initially caused a high compressive stress by the first cycle of heat treatment is tempered by the second heat treatment to give a tensile stress having substantially the same absolute value as that of the compressive stress. Deeper portions of the rod, however, retain tensile stress but of somewhat higher value. For example, in the rod portion from 1.0mm to 2.0mm deep from the surface, there existed a higher tensile stress than that caused in the first cycle of heat treatment. As can be seen from this, with a notch having the depth of 1.0mm to 3.0mm., there occurs a higher tensile stress in a rod at the bottom portion of the notch when using the second method than when using the first method, so that cracks appear having greater depth. The tests revealed that with notches having depths of 1.0mm., 1.5mm., 3mm. the two heat treatments caused cracks of lengths of about 4mm., 4.5mm. and 3mm., respectively, the cracks extending from the bottoms of the notches towards the center of the rod.

In the above first and second cycles of heat treatments, a surface electric power density of 1.2 KW/cm$^2$ to 3 KW/cm$^2$ is suitable for high frequency induction heating, while the input heat quantity of 0.14 Cal/cm$^2$·sec. to 0.36 Cal/cm$^2$·sec. is suitable for heating by other than electric power. However, the present invention is not limited in this respect.

In the above described manner, two cycles of heat treatments are applied, and then a mechanical load is applied to the steel rod in which cracks have occurred, in the same manner as in the first method to break the steel rod along the circumferential notch. The application of a mechanical load may be simultaneous with the second quenching. Thus, the load to be applied in the second method can be further reduced, as compared with that used in the first method, for instance, to 1/10 of that required for a steel rod having a notch only and not subjected to heat treatment. There may result unevenness in the depth of cracks, if uneven heating is applied in the second cycle of the heat treatment depending on the types of steels, such as for instance, SK4 (Japanese Industrial Standards, carbon tool steel). In such case, the same heat treatment as in the described second cycle is repeated to obtain cracks of uniform depth.

As is apparent from the foregoing description, according to the method of the present invention, there is provided a circumferential notch in the surface of a steel rod, and then heat treatment is applied to the notch, and a mechanical load is applied to the steel rod for breaking same. Thus, the steel rod may be accurately broken along a given line under a low load. This method yields satisfactory cut or broken surfaces for the steel rod, thus providing effective solutions to the problems of operation and quality in conventional rod cutting to form billets.

The following examples are illustrative of the features of the present invention.

EXAMPLE 1

There was provided in the surface of a steel rod of SUJ2 (Japanese Industrial Standards, high carbon chromium bearing steel) and of a diameter of 55mm a circumferential notch which had a depth of 1.5mm, a radius of curvature (at the bottom) of 0.25mm, and an open angle of 60°. High frequency induction heating using a valve oscillator under the conditions of frequency of 20 KHz, heating electric power of 70 KW, surface density of electric power of 1.34 KW/cm$^2$ was applied for 6 seconds to the surface of the steel rod in the neighborhood of the aforesaid circumferential notch. The steel rod was quenched into water, immediately after heating.

The steel rod thus prepared was broken along the notch bottom by cantilever bending. The nominal stress required for breaking the steel rod along the notch bottom was found to be 21 kg/mm$^2$. The nominal stress for breaking a steel rod having a diameter of 38mm and used for comparison purpose, which rod had not been subjected to heat treatment, was found to be 158 kg/mm$^2$. Thus, the above nominal stress for the steel rod according to the present invention is reduced to about 1/7 of that required for a steel rod having even a smaller (i.e., 38mm.) diameter and which has not been subjected to heat treatment as required in the inventive method.

Photographs of both broken surfaces of a steel rod at the notch obtained by the present invention as described in Example 1, are shown in FIGS. 4a and b. In each figure, the black portion appearing in the circumference of the cross section represents the notch portion, while the slightly bright black portion inwards thereof represents a crack having a depth of about 4mm. (The depth was measured from the bottom of the notch.) The broken surfaces were found to be satisfactorily flat.

EXAMPLE 2

There was provided a circumferential notch in the surface of a steel rod having the same diameter and of the same type of material as in the Example 1. Then, high frequency induction heating using a valve oscillator under the conditions of frequency of 20 KHz, heating electric power of 86 KW, surface density electric power of 1.65 KW/cm$^2$ was applied for 6 seconds to the surface of the steel rod in the neighborhood of the notch. Then, the steel rod was quenched in water.

Subsequently thereto, high frequency induction heating using a valve oscillator under the same conditions as those above was applied to the steel rod for 4 seconds, and immediately thereafter the rod was quenched into water.

The steel rod thus prepared was broken along the notch bottom by cantilever bending. The nominal stress required for breaking the steel rod along the notch bottom was found to be 16($\pm$1)kg/mm$^2$. As has been described earlier, the nominal stress for breaking a steel rod having a notch only, but not subjected to heat treatment is 158 kg/mm$^2$, and thus the load required for breaking in this case was reduced to about 1/10.

FIGS. 5a and b are photographs of both broken surfaces at a notch of a steel rod as obtained in this example. In these figures cracks are visible having a depth of about 6mm inwardly from the bottom of the notch, and both broken surfaces are flat.

EXAMPLE 3

There was provided a circumferential notch in the surface of a steel rod of SUJ2 (the same as in Example 1) and of a diameter of 38mm, which notch had a depth of 1.0mm, a radius of curvature of 0.25mm at its bottom, and an open angle of 60°. Then, a high frequency induction heating using a valve oscillator under the conditions of frequency of 20 KHz, heating electric power of 91 KW, surface density of electric power of 2.55 KW/cm$^2$, was applied to the rod for 3 seconds. The steel rod was then quenched into water immediately thereafter.

Subsequently, high frequency induction heating was applied under the same conditions as those in the initial heating, in terms of frequency, electric power and surface density of electric power, immediately followed by water quenching.

The steel rod thus prepared was subjected to cantilever bending to break same. The nominal stress required for breaking the rod along the notch bottom was found to be 15 ($\pm$0.9) kg/mm$^2$. In contrast thereto, the nominal stress required for breaking the rod along its notch bottom in the instance where the steel rod had a notch but was not subjected to heat treatment was found to be 158 kg/mm$^2$. This shows that the nominal stress required for breaking the rod according to the present invention is reduced to about 1/10 as compared with the load required in the conventional method.

FIGS. 6a and b show the broken surfaces of a rod at both sides of a notch as produced by the present invention as in Example 3, here described. There is visible in these figures cracks of a depth of about 4.0mm. to 4.5mm., inwardly from the bottom of the notch and both broken surfaces were extremely flat.

EXAMPLE 4

There was provided a circumferential notch in the surface of a steel rod of SK4 (Japanese Industrial Standards, carbon tool steel) and of a diameter of 38mm, which notch had a depth of 2.0mm, a radius of curvature of 0.25mm, at its bottom, and an open angle of 60°. Then, high frequency induction heating under the conditions of frequency of 20 KHz, heating electric power of 91 KW, surface density of electric power of 2.55 KW/cm$^2$ was applied to the rod for 4 seconds. The steel rod was quenched in water immediately thereafter.

Subsequently, high frequency induction heating was applied under the same conditions as those in the first heating above, in terms of frequency, electric power and surface density of electric power and again immediately followed by water quenching.

The steel rod thus prepared was subjected to cantilever bending to break the same. The nominal stress required for breaking the rod along its notch bottom was found to be 22 ($\pm$0.9) kg/mm$^2$. In contrast thereto, the nominal stress required for breaking the rod along the notch bottom when the steel rod has a notch but has not been subjected to heat treatment was found to be 113 kg/mm$^2$. This proves that the nominal stress required for breaking the rod according to the present invention is reduced to about 1/5, as compared with the load stress required under the conventional method.

FIGS. 7a and b show the broken surfaces at both sides of a rod as produced by the present invention as in Example 4, described above. There are visible cracks having a depth of about 2mm when measured from the bottom of the notch, and the broken surfaces are both extremely flat.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A method for breaking a steel rod into billets comprising the steps of:
   forming a circumferential notch in the surface of the steel rod, locally heating the surface areas of the steel rod adjacent such notch so that the surface of the rod at the bottom of the notch is at a temperature less than that at which transformation of ferrite to austenite occurs,
   quenching the rod to thereby develop a crack extending from the bottom of said notch toward the center of the rod, and
   applying a mechanical load to break the rod along said circumferential notch.

2. The method according to claim 1, wherein said mechanical load is applied during the step of quenching.

3. The method according to claim 1, wherein the duration of said heating is between about 2 to 10 seconds and said heating temperature at the surface of the rod at the notch bottom is in the range from about 600°C (inclusive) to a transformation temperature (noninclusive).

4. The method according to claim 3, wherein said heating is high frequency induction heating.

5. The method according to claim 3, wherein said heating is flame heating.

6. The method according to claim 1, wherein said steel rod is made of a steel selected from the group consisting of bearing steel, high carbon alloy steel and high carbon steel.

7. The method according to claim 1, wherein said mechanical load is applied to the rod by bending.

8. The method according to claim 1, wherein said mechanical load is applied to the rod by twisting.

9. The method according to claim 1, wherein said mechanical load is applied to the rod by pulling.

10. A method according to claim 1 wherein the difference in thermal expansion between the surface and interior of the rod, upon heating the surface areas of the steel rod adjacent said notch, creates a sufficiently large tensile stress on subsequent quenching to cause cracks to appear.

11. A method for breaking a steel rod into billets comprising the steps of:
   forming a circumferential notch in the surface of the steel rod, locally heating the surface of said steel rod a first time in the areas surrounding said notch to a temperature above a transformation point of the steel of the rod,
   quenching the rod to thereby harden the surface of the rod in the areas surrounding said circumferential notch,
   locally heating the surface of the rod a second time in the areas surrounding said circumferential notch to such a temperature that the surface temperature of the rod at the bottom of said notch is less than a transformation temperature of the steel of said rod,
   quenching the rod to thereby develop a crack extending from the bottom of said notch toward the center of the rod, and
   applying a mechanical load to break the rod along said circumferential notch.

12. The method according to claim 11, wherein said mechanical load is applied during the second step of quenching.

13. The method according to claim 11, wherein said first heating is performed for about 2 to 10 seconds at a temperature in the range from about 800°C to 1100°C, and said second heating is performed for about 1 to 8 seconds at a temperature in the range from about 500°C (inclusive) to a transformation temperature (noninclusive).

14. The method according to claim 13, wherein said first and second heating steps are performed by high frequency induction heating.

15. The method according to claim 13, wherein said first and second heating steps are performed by flame heating.

16. The method according to claim 11, wherein said rod is made of a steel selected from the group consisting of bearing steel, high carbon alloy steel and high carbon steel.

17. The method according to claim 11, wherein said mechanical load is applied to the rod by bending.

18. The method according to claim 11, wherein said mechanical load is applied to the rod by twisting.

19. The method according to claim 11, wherein said mechanical load is applied to the rod by pulling.

* * * * *

UNITED STATES PATENT OFFICE
CERTIFICATE OF CORRECTION

Patent No. 3,958,732  Dated May 25, 1976

Inventor(s) AOYAMA ET AL

It is certified that error appears in the above-identified patent and that said Letters Patent are hereby corrected as shown below:

In the heading on the title page under [30] "Dec. 15, 1973" should read --Dec. 22, 1973--; "48-4050" should read --49-4050--.

Signed and Sealed this

Twenty-first Day of September 1976

[SEAL]

*Attest:*

RUTH C. MASON
*Attesting Officer*

C. MARSHALL DANN
*Commissioner of Patents and Trademarks*